July 24, 1956     K. K. ROTTCHER     2,756,098
SELF-PROPELLED, AUTOMATIC, OVERHEAD IRRIGATION PLANT
Filed Sept. 30, 1953     2 Sheets-Sheet 1
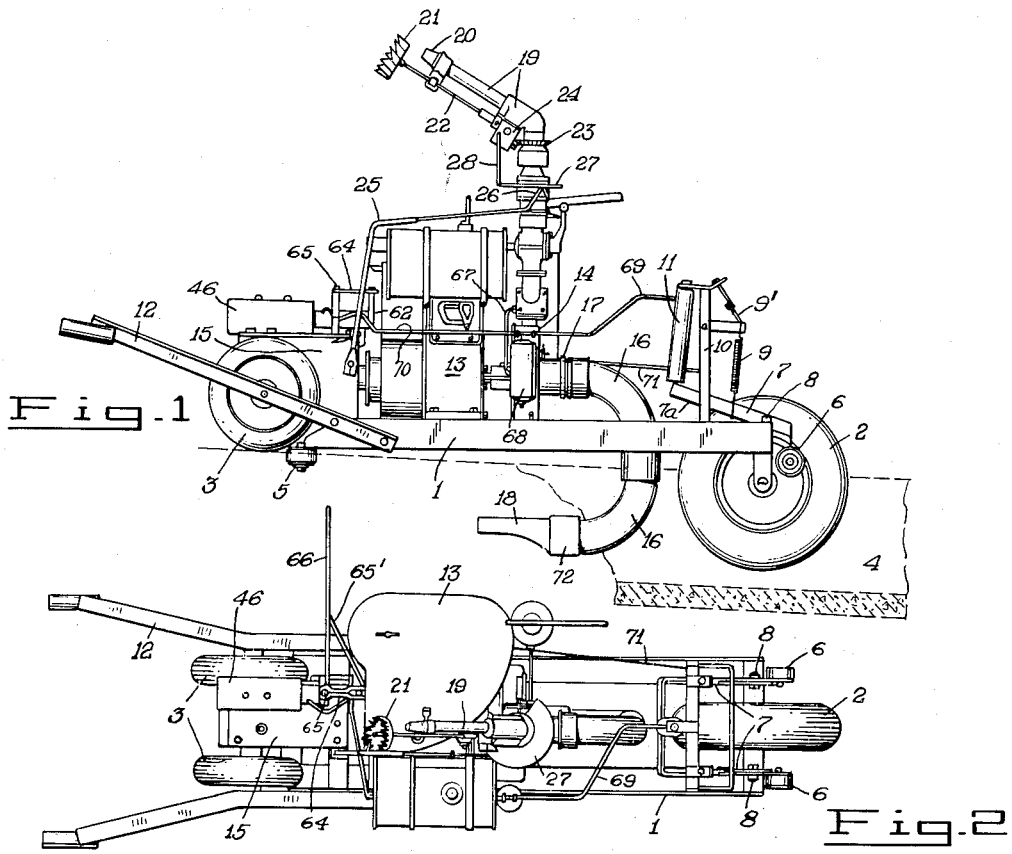
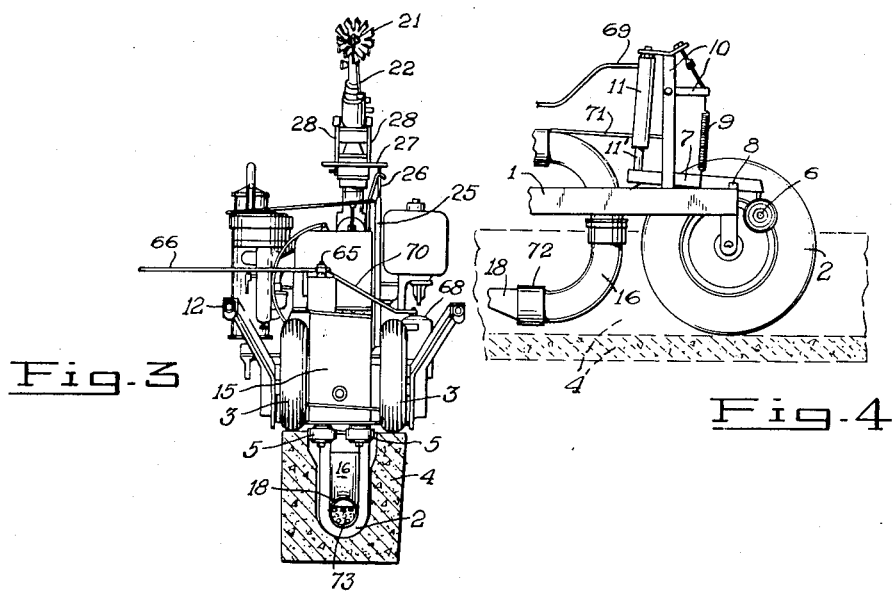

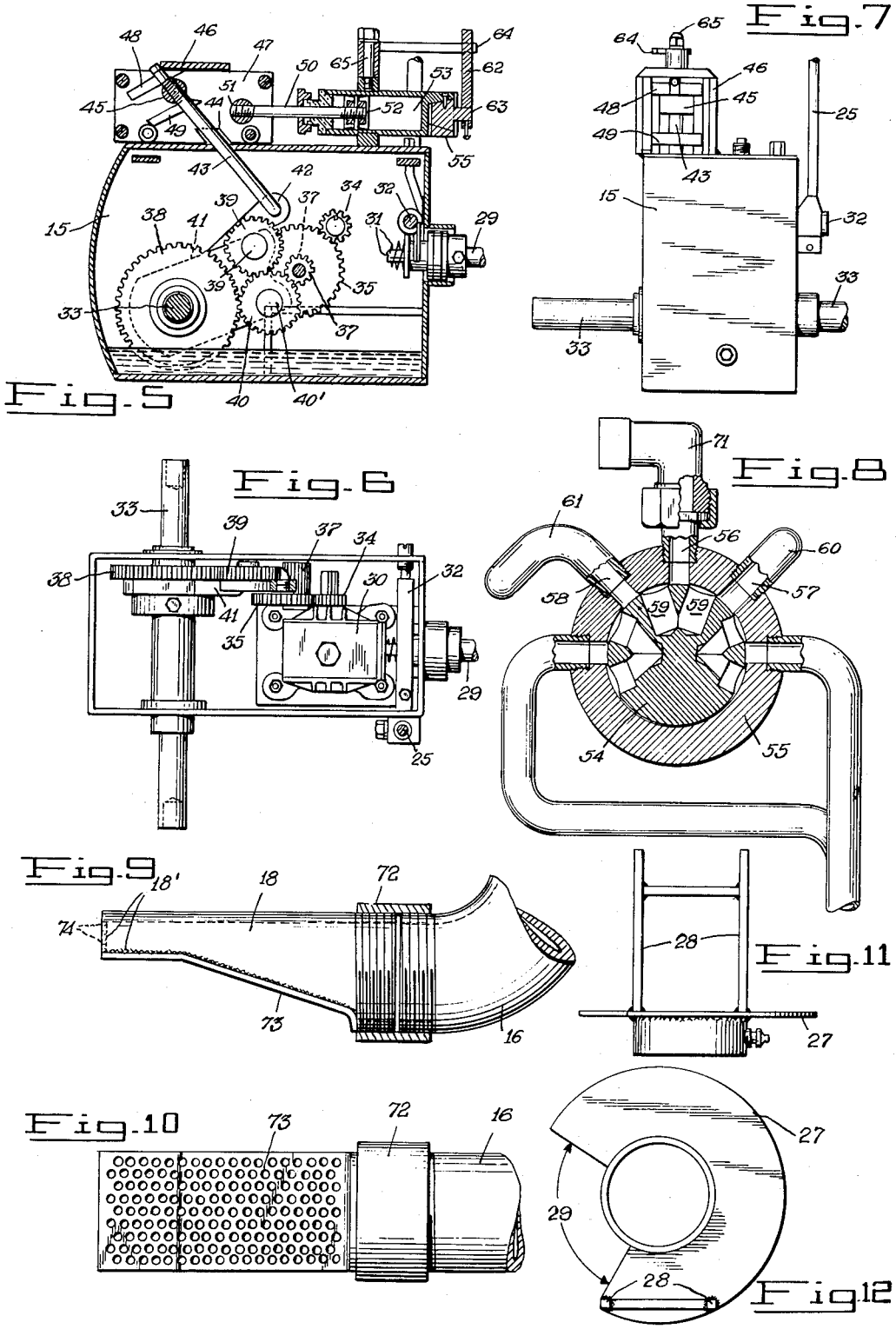

United States Patent Office 2,756,098
Patented July 24, 1956

2,756,098

SELF-PROPELLED, AUTOMATIC, OVERHEAD IRRIGATION PLANT

Kurt Karl Rottcher, Golden Valley, Natal, Union of South Africa

Application September 30, 1953, Serial No. 383,232

Claims priority, application Union of South Africa October 4, 1952

11 Claims. (Cl. 299—52)

This invention relates to overhead irrigation plants or machines of a kind comprising a wheeled vehicle chassis carrying a water pump, a source of motive power therefor, an inlet for water to the pump from an irrigation furrow provided along the ground to be irrigated and along which the chassis is traversible under power and means for delivering water from the pump as a spray over the ground.

The principal object of the invention is to provide an improved plant or machine as aforesaid adapted for a methodical, uniform and highly effective irrigation action, for automatic operation without attention over extended periods of time, e. g. overnight or otherwise when conditions have been found best suited for economical and efficient irrigation, and capable automatically of becoming inoperative if and when conditions, such as lack of water at the pump inlet, and/or other conditions, become inhibitive to efficient pumping and spraying actions.

A further object is to provide a machine or plant of the kind indicated which is efficiently operable over land, whether or not it be level or already irrigated, where an adequate supply of water may be fed to furrows as aforesaid for distribution by the machine.

According to the invention a self-propelled automatic overhead irrigation plant comprises an engine and pump unit mounted on a chassis, said pump being connected to a rotating spray nozzle device, said chassis being mounted on a single wheel at one end adapted to run in a prepared furrow, and a pair of wheels at the opposite end of the chassis adapted to run one on each side of said furrow, said single wheel being adapted to dam up the water in the furrow sufficiently to cover a suction inlet of said pump, means being also provided for automatically raising the chassis and more particularly raising the said single wheel in relation to the furrow in the event of the engine stopping and/or insufficient water having been supplied to the furrow.

More particularly an overhead irrigation machine of the kind referred to comprises a chassis having a supporting wheel suited to enter and run in a water-supplying ground furrow, means for raising and lowering said wheel with respect to the chassis, other wheels for further supporting the chassis from outside the channel of such furrow, a water pump and a self-contained power-generating unit carried by the chassis, drives from said unit respectively to the water pump and to such other wheels, an intake member dependent from the pump to enter the furrow and be fed with water from it, and a water spray-creating device associated with the pump delivery and devised to rotate about an upright axis for the irrigation of circular areas centered in the machine.

The rotating spray device referred to above may comprise a nozzle having associated with it in any convenient way means driven by the water traversing the nozzle for producing the requisite rotations of the nozzle.

According to the invention also means may be included which is rotatable with the nozzle for the control of clutch means included in the chassis wheel drive so as to produce alternate advancing movements and halts of the machine suitably synchronized with the rotations of the nozzle.

The invention also consists in self-propelled automatic overhead irrigation machines or plants and component parts thereof substantially as hereinafter set forth in the description and in the appended claims.

A convenient embodiment of the invention is now described generally and briefly as follows:

An internal combustion engine with coupled pump is mounted on a chassis provided with three wheels. The front wheel, which may be an ordinary pneumatic wheelbarrow wheel, runs in a furrow which is provided in concrete and suitably constructed with a regular cross-section to conform to the dimensions and form of the wheel. The object of this wheel is to dam the water in the furrow, as well as carry the front of the machine.

Located behind this wheel so as to enter the furrow is a special intake pipe to the pump which discharges to a generally known type of so-called "rainer" which is mounted on the pump outlet and the function of which is to subdivide the water from the pump outlet into a rain as explained hereinafter with reference to the drawings.

The pump runs at a pressure of for instance approximately 80 lb., and between the pump and the rainer, a small pipe leads to a hydraulic plunger ram. The action of this plunger ram is to depress the front wheel into the concrete furrow, as soon as the pressure is high enough to overcome the tension of a spring, which is devised to lift the wheel partially out of the furrow when the pressure drops too low for the efficient working of the rainer. At the same time as the spring raises the wheel it will switch off the engine and so stop the whole plant.

The wheel having been lifted, the water can escape underneath the wheel and thus prevent its spilling over the sides of the furrow and giving rise to wastage and erosion.

Behind the engine a reduction gear is fitted to the engine shaft, whereof the normal operating speed is some 2,000 R. P. M., the output speed of reduction gear being some 33 R. P. M. On to this output shaft a small gear is fitted running on to a larger gear, on to which in turn is fitted a small gear. On to this small gear there are tumbler gears which in turn run on to a larger gear again, the speed of which last may thus be approximately 2.44 R. P. M.

The tumbler gears constitute a reversing gear which enables the machine to run in either direction along the furrow, and the last gear drives on the axle of the two back wheels (pneumatic or solid) which are arranged to ride on the top of the concrete furrow, one on either side. The drive thus provided propels the machine at about 2.36 yards per minute.

For reversing the drive through the above-mentioned tumbler gears a lever is provided which is operable from the outside of the machine through the agency of a further lever which extends horizontally from the machine. At the end of the length of furrow to be traversed by the machine a stake is driven into the ground, and as soon as the last-mentioned lever runs against this stake, it switches over the tumbler gears and the machine is thus put into reverse up the furrow. This process can thus be repeated until the required application of water from the rainer has been achieved.

The preferred construction of machine is more fully and particularly described below with reference to the accompanying drawings wherein:

Figure 1 is a side elevation of the machine with a fragmentary section of the furrow in the relationship assumed by the machine when inoperative from any cause;

Figure 2 is a plan of the machine;

Figure 3 is an elevation at the rear end of the machine showing a section through the furrow and how the front wheel fits therein when lowered into the position which is apparent from Figure 4 which is a fragmentary repetition of Figure 1 with the front wheel lowered;

Figure 5 is a longitudinal section of a gear box with associated hydraulically motivated reversing gear;

Figure 6 is a plan showing the interior of the gear box;

Figure 7 is the outside rear elevation corresponding to Figure 5;

Figure 8 is an enlarged cross-section through the hydraulic reversing valve included in Figures 5 and 7;

Figures 9 and 10 are respectively an outside elevation and an inverted plan of the pump intake member, to an enlarged scale; and Figures 11 and 12 are respectively an elevation and a plan to an enlarged scale of a form of cam type drive for the operation of a clutch included in the wheel drive.

Referring first to Figures 1 to 4 of the accompanying drawings, the machine comprises a chassis 1 supported at the front by a wheel 2 having a pneumatic tire and at the rear by a pair of wheels 3 in such mutual arrangement as to provide a tricycle support whereof the front wheel 2 may run on the bottom of a prepared concrete or like furrow 4 while the rear wheels 3 may run on the upper edges of the furrow, the section of the furrow being apparent from Figure 3 and such as to be moderately closely fitted by the front wheel 2. A pair of rollers 5 set on vertical axes are arranged, when the machine is in position over the furrow, to guide the machine by engagement with the upper inside surfaces of the furrow channel.

In addition, at the front of the chassis slightly in advance of the center of the front wheel are provided a pair of rollers 6 which are supported at the front portion of a lever frame 7 pivotally connected to the chassis at the region 8 with its rear end 7a resiliently loaded upwardly by tension spring means 9 associated with a fixed pillar structure 10 erected near the front of the chassis. The rear and free end of the lever frame 7, which in the static condition of the machine locates the rollers 6 in such a way that they engage the upper edges of the furrow and thus lift the front of the chassis to raise the front wheel 2 clear of the bottom of the furrow, is reacted upon downwardly by a hydraulically operated ram 11 which is motivated as hereinafter explained.

The chassis, which also comprises suitable maneuvering handles 12 projecting from its rear end, has mounted thereon a combined unit of an internal combustion engine 13 coupled with a water pump 14 and the shaft of the engine also drives the rear wheels 3 through gearing later to be described contained in a gear box 15 located behind the engine.

The pump intake member comprises a rigid bend 16 curving downwardly and rearwardly from the pump inlet connection at 17 to end in an intake "nozzle" member 18 the construction of which is later described, and which, as will be apparent from the drawings, enters the furrow behind the front wheel.

On the delivery side of the pump is fitted a so-called rotary rainer device, of a generally known type, indicated generally by reference 19, the nozzle 20 of which is associated with a rotary impeller 21 which serves the double purpose of reducing the water jet emerging from the nozzle 20 into the form of an even rain and, under its rotation on the shaft 22, operating a bevel gear 23 through a suitable enclosed speed reduction gear at 24 producing bodily rotation of the rainer about a vertical axis in journaled means suitably incorporated in the connection between the rainer and the delivery branch of the pump.

Incorporated between the gear in the box 15 and the engine shaft is a clutch whereof the operating arm 25 extends upwardly behind the engine and forwardly over the top thereof in a bend, to finish in an end portion 26 of inverted V-shape which is upwardly engageable against a cam disc 27. The said cam disc is mounted concentrically with the rainer journal and is provided with a fork arrangement 28 upstanding from its upper side in such a manner as to form a connection between the body of the rainer and the cam disc whereby the latter rotates together with the rainer when the nozzle is discharging water and acting on the impeller 21. In Figures 11 and 12 the disc 27 is seen to have a segmental gap, indicated by reference 29, the purpose of which gap is cam-wise to operate on the end 26 of the clutch control lever 25 in such a manner that once per revolution of the rainer the engine is clutched to the gear through which the rear wheels 3 are driven and for the remainder of the revolution the drive to the rear wheels is interrupted whereby the whole machine halts and remains stationary at the point on the furrow which it has then reached. It will be understood that the relative shapes and dimensions of the gap 29 and the end 26 of the operating member 25 will determine the respective intervals of motion and halting of the machine and the disc 27 may accordingly be substitutable to meet particular requirements in this respect.

Adverting now to the gear box for a more detailed description thereof with reference to Figures 5, 6 and 7, the rear end of the engine shaft 29 drives a high-ratio reduction gear 30 through a clutch shown generally at 31 whereof the operating parts include a transverse shaft 32 passing to the exterior of the casing of the gear box and connected as shown to the clutch-operating lever member 25 in Fig. 5, in order clearly to expose the reversing gear train in side elevation the reduction gear unit 30 appearing between the shaft 29 and the pinion 34 in Fig. 6 has been omitted. From the reduction gear 30, a drive is taken to a transverse shaft or axle 33 on the outer ends of which are suitably fixed the rear wheels 3 aforementioned. This drive comprises a pinion 34 meshing with a wheel 35 coupled with which on a common shaft 36 is a second pinion 37 from which the drive is transmitted to a final gear wheel 38 fixed on the shaft 33 optionally via either of the two intermediate gears 39 and 40, according to the direction in which the shaft 33 is required to be driven. The gears 39 and 40, which constantly mesh together, are supported respectively on shafts 39' and 40' carried by an arm 41 which may be rocked about the shaft 33, either upwardly to engage the gear 40 with the pinion 37, as shown in Figure 5 and thus to disengage the gear 39 from the pinion 37, or alternatively downwardly to engage the gear 39 with the pinion 37 and free the gear 40 from the latter. The gear 40 being constantly in mesh with the gear 38, means is thus afforded for effecting a reversal of the direction of the wheel shaft 33 as and when required. The reversing motion of the arm 41 is produced through an associated arm 42 from a pivotal joint at the extremity of which a rod 43 passes rearwardly and upwardly through a guide 44 in the top of the gear box casing and has there attached to it a collar preferably of a cylindrical formation 45. In a guide structure 46 provided on the top of the gear box casing a reciprocable slide member 47 co-operates through parallel inclined surfaces 48, 49 thereon with the upper and lower parts of the collar 45 in such a way as to reciprocate the rod 43 outwardly or inwardly with respect to the gear box with appropriate reciprocation of the plate 47. This latter action is produced hydraulically through a piston rod 50 coupled at its extremity 51 with the plate 47 and whereof the piston 52 is reciprocable in a hydraulic cylinder 53 arranged as shown on the forward upper part of the gear box. The admission and release of hydraulic pressure into and from the cylinder 53 is under the control of a part-rotary control valve the essential features of which are shown on a much larger scale in Figure 8.

Referring to Figure 8, the control valve comprises a plug 54 and a fixed body 55 in the form of a forward extension of the cylinder 53. The plug is shown in a neutral position and when rotated through a small angle in either direction connects an inlet at 56 with one or other of the connections at 57 and 58 via the appropriate recesses or transfer ports 59 in the plug 54. In this way through pipes 60 or 61, the hydraulic pressure is transmitted optionally to one or other side of the piston 52 working in the cylinder 53, therefore determining the setting of the gear-carrying arm 41 and the direction in which the machine will move along the furrow. The remaining ports and pipes shown serve for exhausting from the respective sides of the piston 52.

For operation of the valve plug 54, there is provided an arm 62 extending upwardly from the stem 63 of the plug and co-operating with a fork 64 which is pivoted on an upright pin 65 and attached with suitable bracing at 65' to an arm 66 which projects horizontally from one side of the machine as shown in Figures 2 and 3. It will be understood that, if a suitable stake or the like be erected in the ground alongside the furrow in the path of the arm 66, then engagement of the arm with the stake or the like will effect angular movement of the arm 66 in the appropriate direction about the pivot at 65, thus affording a means of automatically reversing the motion of the machine at the end or any other point in the length of the furrow, the reverse action taking place when the machine has returned along the furrow to engage the arm 66 against a further stake placed at any other suitable point.

Adverting now to the hydraulic supply to the front wheel raising and lowering mechanism and to the valve of the reversing gear, a pipe connection is made at 67 from the outlet side of the pump 14 to a filter or trap vessel 68 from the upper part of which a connecting pipe 69 leads forwardly to the upper end of the jack cylinder 11 thus placing the upper end of the plunger 11' in the cylinder 11 in continuous communication with the water pressure obtaining at any time in the pump outlet, i. e. the pressure at which water is being delivered upwardly to the nozzle of the rainer. The action of pressure in the pipe 69 is to force the plunger 11' outwardly and depress the rear end of the frame 7 whereby relatively to raise the front rollers 6 and thereby lower the front wheel 2 into the furrow to occupy the position in which it is shown in Figures 3 and 4. The resistance offered by the spring system 9 to such action is so adjusted, in any convenient manner, as by an anchoring link 9' of adjustable length, as to require the pump to be operating satisfactorily for serving the nozzle 20 before the front wheel 2 may run in the bottom of the furrow. At lower pumping pressures, or when the pumping unit is stopped, the machine thus resumes the position in which it is shown in Figure 1.

Also, from the filter 68, a further pipe 70 extends rearwardly to connect via a bend 71 with the inlet connection 56 to the valve as shown in Figure 8, whereby so long as the pump is running and adequate pressure exists in the pump outlet the drive-reversing gear is capable of being operated by the member 66 in the manner above described.

For the purpose of stopping the engine whenever the front wheel is raised in relation to the furrow, whether from failure of the pumping pressure e. g. owing to lack of sufficient water in the furrow, or from any other cause, as if the wheel 2 is lifted deliberately or otherwise by an obstruction in the furrow, an operative connection is made between the frame 7 and the ignition control for the engine, e. g. through a transmission rod 71 devised to be operated in the requisite direction to switch off the engine as and when the rollers 6 are thrust downwardly under the return action of the spring system 9.

For a satisfactory operation of the machine, a preferred construction of the intake member to the pump has been devised as shown in Figures 9 and 10. The intake member 18 comprises a length of pipe connected by a screw socket 72 to the bend 16, partly cut away along its underside in the manner shown in Figure 9 and closed by a perforated plate 73 presenting a rearwardly and upwardly sloping portion merging into a horizontal portion which co-operates also to close the rear extremity of the member 18 at 18'. As will be seen from the inverted plan in Figure 10, the plate 73 is liberally and uniformly perforated over substantially the whole of its area and, referring to Figure 9, a small breather hole is provided in the end closure at 74. It is found that this form of intake member operates completely satisfactorily at relatively shallow immersion in water and that so long as sufficient water is provided about the device fully to immerse the perforated plate 73, a condition which is readily assured by the damming action on the water of the front wheel 2 when the device is in proper operation, the suction conditions are fully effective for efficient operation of the pump and therefore also for efficient operation of the irrigating spray.

The machine as above described may be most advantageously employed by providing prepared furrows (which are easily and cheaply moulded in sections from concrete and like mixtures) running parallel over the ground some 50 to 60 yard intervals according to the effective throw of water spray obtainable by the rainer as it rotates over the machine, such throw being found to vary with altitude and ambient humidity. By this means, all areas of land between the furrows may be effectively irrigated by the machine. Thus, with the machine in position at one end of one furrow and the pumping unit in operation, the rainer rotates and irrigates an area centered in the machine and of a radius equal to the effective throw of the spray, e. g. some 25 to 30 yards. Once in each revolution of the rainer in the device described, through the cam disc drive and the clutch-operating member 25, the machine advances for example some 4 yards each 5½ minutes along the furrow and thereupon halts while the rainer completes the remainder of its turn. These actions are repeated, with substantial overlap of the circular areas served by the rainer, until the entire or other length of the furrow is traversed by the machine; and the particular method of irrigation thus provided completely avoids puddling or other wastage of sprayed water, the whole of which is enabled to soak in evenly into the ground on both sides of the furrow and for the entire length of traverse of the machine. When the machine reaches the end or any other selected point of a furrow, an erected stake at such point throws over the reversing gear arm 66 and the machine then repeats its operation in the reverse direction along the furrow; these actions being continuous and taking place entirely automatically without any attention so long as the engine continues to run and the pump is operating with full efficiency. In failure of these conditions, as when fuel is exhausted, when water in the furrows is inadequate, or the pump intake becomes choked, the machine at once stops completely and remains so until the fault or faults is/are suitable rectified; whereby there is no possibility of the machine continuing to operate in an inefficient manner with wastage of water and/or producing defective and therefore inefficient irrigation.

The land on each side of any one furrow having thus been irrigated, the machine is readily transferred from that furrow to an adjoining furrow, it being readily portable and maneuverable across the ground, wheelbarrow fashion, by the rear handles 12.

Whereas the height from the pump discharge to the nozzle 20 of the rainer is desirably as short as possible to reduce water friction losses and enable nozzle pressures of as much as 95 lbs. per square inch to be obtained with a correspondingly high effective range of the water spray, it is within the ambit of this invention to provide an extension between the rainer and the pump outlet to raise the nozzle 20 to any desired height above the ground level, as for instance to adapt the machine to the effective overhead irrigation of fruit trees and other plants of considerable height. In such an arrangement, which may involve incidental modifications of the drive between the rotating rainer parts and the clutch-operating member 25, it is desirable, is not essential, to provide for a general steadying of the machine against the toppling tendency of the thus-heightened superstructure. To this end, a frame or the like may be provided in connection with the chassis having a lower part adapted to enter the furrow, e. g. in the region of the pump-intake member 18, to provide a steadying "keel" device engaging preferably through roller means laterally with one or other side of the furrow channel. Alternatively, any suitable form of outrigger structure may be provided in connection with the chassis of the machine for stabilizing it laterally, against for instance the toppling action aforementioned and/or windage effects on the superstructure.

I claim:

1. In an irrigation machine for operating along a water supply furrow, a chassis having a plurality of supporting wheels, a self-contained power unit and a water pump mounted on said chassis, driving connections between said power unit and said pump and between said power unit and the wheels for driving the machine, a rotary spray-creating device having a connection to the pump output for irrigation of areas centered at the machine, a water-intake member connected to the pump and dependent from the chassis for location in the water-supply furrow when the machine is supported thereover by said wheels, means for causing one of said wheels to run in the furrow, said one wheel being shaped complementarily to the furrow so as to form a dam in the furrow, resilient means tending to urge said one wheel out of the furrow, and hydraulic ram means responsive to the fluid pressure of the pump output, for overcoming the action of the resilient means and maintaining the said one wheel in its operative chassis-supporting and water-damming position in the furrow when said fluid pressure has a value which causes efficient operation of the spray-creating device.

2. In an irrigation machine according to claim 1, switching means for rendering the power unit operative and inoperative, means for operatively linking the switching means with the resilient means for switching off the power unit when the resilient means overcomes the ram means and raises said one wheel from the furrow.

3. An irrigation machine according to claim 1 wherein said driving connections between the power unit and the wheels includes clutch means, cam means operatively connected with the rotary spray-creating device for rotation therewith, and linkage means between the clutch means and the cam means for effecting alternate engagement and disengagement of the clutch means during each complete revolution of said device.

4. An irrigation machine according to claim 1 wherein the water-intake member comprises a generally horizontally arranged pipe member having water-admitting perforations confined to a wall presented downwardly towards the base of the furrow and wholly immersible in the furrow water at levels thereof insufficient completely to immerse the pipe member.

5. An irrigation machine according to claim 4 wherein said downwardly presented wall of the water-intake member has a surface extending generally at a small inclination to the horizontal and is provided with perforations over substantially its whole area.

6. In an irrigation machine according to claim 1, means for automatically stopping the power unit when said one wheel is raised in relation to the furrow.

7. An irrigation machine according to claim 1 wherein the rotary spray device includes means for causing the water passing through the nozzle to rotate the nozzle.

8. An irrigation machine according to claim 1, wherein the driving connections between the power unit and the wheels includes clutch means, and means rotatable with the nozzle for controlling the clutch means so as to produce alternate advancing movements and halts of the machine in synchronism with the rotations of the nozzle.

9. An irrigation machine according to claim 1 wherein the driving connections between the power unit and the wheels include means for reversing the direction of rotation of said wheels by the power unit, said reversing means including a reversing gear and a control member therefor movable to effect reversal of the movement of the machine by engagement alternately with abutments suitably positioned along the furrow.

10. An irrigation machine according to claim 1 wherein the driving connection between the power unit and the wheels includes gear means for reversing the driving direction of the wheels, hydraulic means for operating the reversing gear means, and a fluid connection including a valve extending from the output side of the pump to the hydraulic means for actuating the hydraulic means.

11. In an irrigation machine for operating along a water supply furrow, a chassis having a plurality of supporting wheels, a self-contained power unit and a water pump mounted on said chassis, driving connections between said power unit and said pump and between said power unit and said wheels, a spray creating device having a connection to the output side of the pump, a water-intake member connected to the intake side of the pump and dependent from the chassis for location in the furrow when the machine is supported thereover by said wheels, means for causing one of said supporting wheels to run on the bottom of the furrow, and means connected to the output side of the pump and to said one wheel for lifting said wheel in response to a drop of the water pressure at the output side of the pump below a predetermined value.

References Cited in the file of this patent

UNITED STATES PATENTS

| | | |
|---|---|---|
| 1,107,119 | Searle | Aug. 11, 1914 |
| 1,902,412 | Melin | Mar. 21, 1933 |
| 2,294,918 | Levy | Sept. 8, 1942 |
| 2,515,047 | Latieule | July 11, 1950 |
| 2,574,634 | Frampton | Nov. 13, 1951 |
| 2,628,863 | Maggart | Feb. 17, 1953 |
| 2,718,433 | Poyner | Sept. 20, 1955 |